United States Patent [19]
Kohl

[11] Patent Number: 6,163,878
[45] Date of Patent: Dec. 19, 2000

[54] METHOD AND SYSTEM FOR DESIGNING, GENERATING AND STORING APPLICATIONS

[75] Inventor: Jereme Kohl, 2838-B Fulton St., Berkeley, Calif. 94705

[73] Assignee: Jereme Kohl, Burlington, Vt.

[21] Appl. No.: 09/053,005

[22] Filed: Mar. 31, 1998

[51] Int. Cl.[7] .................................................. G06F 9/45
[52] U.S. Cl. .......................... 717/1; 717/2; 717/5; 707/1; 707/513
[58] Field of Search ...................... 395/701, 702, 395/703, 705; 707/1, 2, 9, 10, 103, 104, 501, 505, 513, 3, 4; 709/202, 203, 208, 209, 216–219, 227, 228; 717/1, 2, 3, 5

[56] References Cited

U.S. PATENT DOCUMENTS

| | | | |
|---|---|---|---|
| 5,838,916 | 11/1998 | Domenikos et al. | 709/219 |
| 5,857,191 | 1/1999 | Blackwell, Jr. et al. | 707/10 |
| 5,889,942 | 3/1999 | Orenshteyn | 713/201 |
| 5,940,834 | 8/1999 | Pinard et al. | 707/102 |
| 5,945,989 | 8/1999 | Freishtat et al. | 345/329 |
| 5,974,430 | 10/1999 | Mutschler, III et al. | 707/505 |
| 5,974,443 | 10/1999 | Jeske | 709/202 |
| 5,978,834 | 11/1999 | Simonoff et al. | 709/203 |

OTHER PUBLICATIONS

Roesler et al., "Intelligent Agents", Online, Jul. 1994, pp 19–32.
Shankar, "Web application development environment", InfoWorld, Mar. 1997, start p. 54a.
Biggs, "BETA; Java Development tool; Mojo working on data support", InfoWorld, Feb. 1997, p. IW/1.
Peterson, "The evolution of Intelligent agents", Business Communications Review, Nov. 1996, pp 38–41.

*Primary Examiner*—Kakali Chaki
*Attorney, Agent, or Firm*—Blakely Sokoloff Taylor & Zafman, LLP

[57] ABSTRACT

A method and system for designing, generating and storing applications is disclosed. The system comprises a Web client, a Web server coupled in communication with the Web client, an interpretive server coupled in communication with the Web client and the Web server and an application database coupled in communication with the Web client via the interpretive server.

20 Claims, 11 Drawing Sheets

TABLE 400

| # OF ROWS IN PAGELET | CONTROL TYPE |
|---|---|
| 1 | ALL STATIC |
| 1 | ONE STATIC |
| MANY | ALL STATIC |
| MANY | AT LEAST ONE NON-STATIC |

METHOD AND SYSTEM FOR DESIGNING, GENERATING AND STORING APPLICATIONS

FIELD OF THE INVENTION

The present invention relates to the field of application development technology. Specifically, the present invention relates to a method and system for designing, generating and storing applications.

DESCRIPTION OF RELATED ART

In traditional client-server environments, client applications are generally developed by application developers. The bulk of application development tools available today include complex development environments that require an application developer to be familiar with computer programming. Even so-called "simplified" Rapid Application Development (RAD) tools are complicated enough that a user requires some familiarity with computer programming in order to effectively create an application.

Application developers are thus likely to be computer programmers rather than end users with no computer programming experience. Once an application developer completes the design and generation of an application, the end user simply runs the applications. For example, an application developer may design and generate an input form and the end user simply runs the form and inputs data into the appropriate fields in the form. The end user cannot modify the form without at least some programming knowledge of the application development tool. This paradigm is an inflexible and restrictive one that forces an artificial delineation between application developers and end users of applications.

With the growth of the World Wide Web ("the Web"), this traditional inflexible application development environment is becoming increasingly problematic. Unlike users of client/server environments who are able to access only a limited set of information from a limited number of locations, the Web presents the opportunity for companies to communicate more directly with each other and for users to exploit network connections from any given location. Thus, in order to provide Web users with the functionality that they require, application programmers would have to be constantly creating applications to service their needs. This type of scenario clearly presents a problem to a Web user who may wish to create applications on the fly to retrieve the variety of data available to him or her.

Additionally, traditional client-server applications experience a number of functional problems on the Web due to architectural limitations of the Web. For example, in a traditional client-server environment, the client machine may maintain a persistent connection to the server machine for as long as the client machine remains logged on to the server via a particular application. As such, a user is able to retrieve and manipulate data over a client-server connection in an extremely flexible manner.

In contrast, within the Web environment, a client (namely a Web browser) and a server (namely a Web server) do not maintain a persistent connection. Each time a request is made from a Web browser to a Web server, a temporary connection is established between the Web browser and the Web server. This process has to be repeated for every request from the Web browser because after each request is satisfied, the connection between the Web browser and the Web server is dropped. This "stateless" connection between the Web browser and the Web server results in numerous problems for applications running on the Web. When a user moves between Web pages, the information pertaining to the previous Web page is lost.

Although theoretically possible for developers to create Common Gateway Interface (CGI) programs to perform some of the same functions that application tools allow in a client-server environment, the practical reality of creating and maintaining these programs renders this a non-viable solution. The developer creating the programs would be forced to manually code the entire connection, retention of data, and the manipulation of data by the users. Many functions relating to manipulation of data require expertise in the use of Standard Query Language (SQL), a language specific to database usage. Thus, even if having multiple application developers on hand at all times were a viable solution, Web architecture today limits the types of applications that can be developed and run successfully on the Web.

SUMMARY OF THE INVENTION

The present invention describes a method and system for designing, generating and storing applications. The system comprises a Web client, a Web server coupled in communication with the Web client, an interpretive server coupled in communication with the Web client and the Web server and an application database coupled in communication with the Web client via the interpretive server.

Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

The present invention describes a method and system for designing, generating and storing applications. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

Figure 1:
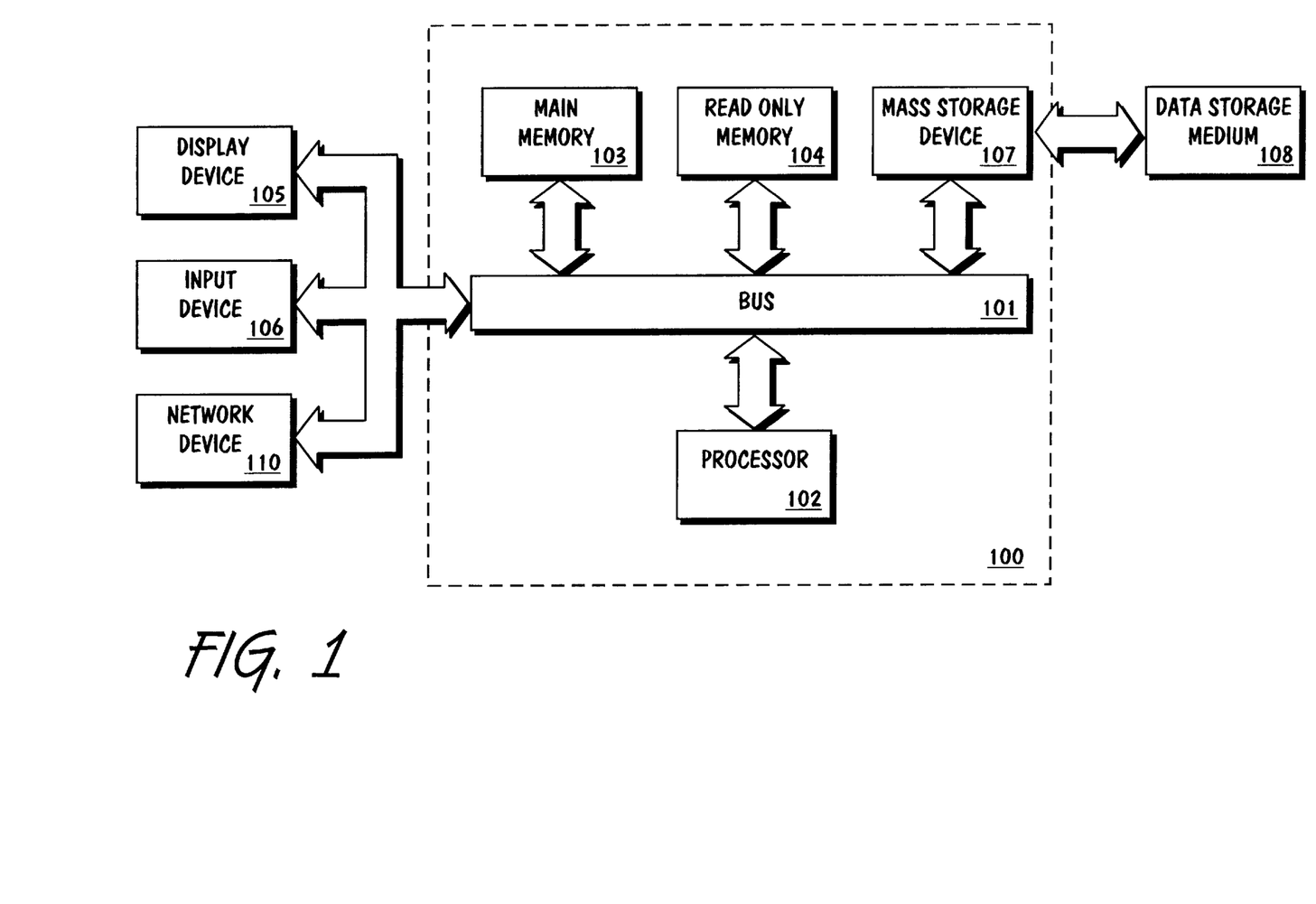
FIG. 1 illustrates a typical computer system 100 in which the present invention operates.

FIG. 1 illustrates a typical computer system 100 in which the present invention operates. One embodiment of the present invention is implemented on a personal computer (PC) architecture. It will be apparent to those of ordinary skill in the art that alternative computer system architectures or other microprocessor based devices may also be employed.

In general, such computer systems as illustrated by FIG. 1 comprise a bus 101 for communicating information, a processor 102 coupled with the bus 101 for processing information, main memory 103 coupled with the bus 101 for storing information and instructions for the processor 102, a read-onlymemory 104 coupled with the bus 101 for storing static information and instructions for the processor 102, a display device 105 coupled with the bus 101 for displaying information for a computer user, an input device 106 coupled with the bus 101 for communicating information and command selections to the processor 102, and a mass storage device 107, such as a magnetic disk and associated disk drive, coupled with the bus 101 for storing information and instructions. A data storage medium 108 containing digital information is configured to operate with mass storage device 107 to allow processor 102 access to the digital information on data storage medium 108 via bus 101.

Processor 102 may be any of a wide variety of general purpose processors or microprocessors such as the Pentium® processor manufactured by Intel® Corporation. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 108 may be a hard disk, a floppy disk, a CD-ROM, a magnetic tape, or other magnetic or optical data storage medium.

In general, processor 102 retrieves processing instructions and data from a data storage medium 108 using mass storage device 107 and downloads this information into random access memory 103 for execution. Processor 102, then executes an instruction stream from random access memory 103 or read-only memory 104. Command selections and information input at input device 106 are used to direct the flow of instructions executed by processor 102. Equivalent input device 106 may also be a pointing device such as a conventional mouse or trackball device. The results of this processing execution are then displayed on display device 105.

Computer system 100 includes a network device 110 for connecting computer system 100 to a network. Network device 110 for connecting computer system 100 to the network includes Ethernet devices, phone jacks and satellite links. It will be apparent to one of ordinary skill in the art that other network devices may also be utilized.

One embodiment of the present invention is implemented as a software module, which may be executed on a computer system such as computer system 100 in a conventional manner. Using well known techniques, the software of this embodiment is stored on data storage medium 108 and subsequently loaded into and executed within computer system 100. Once initiated, the software according to this embodiment operates in the manner described below.

Overview of Web Architecture

Web pages contain hypertext links that are used to connect any combination of graphics, audio, video and text, in a non-linear, non-sequential manner. Hypertext links are created using a special software language known as HyperText Mark-Up Language (HTML). Web client machines running Web browsers can access these Web pages at Web sites via a communications protocol known as HyperText Transport Protocol (HTTP). A Web browser allows a Web client to request a particular Web page from a Web site by specifying a Uniform Resource Locator (URL). A URL is a Web address that identifies the Web page and its location on the Web. When the appropriate Web site receives the URL, the Web page corresponding to the requested URL is located, and if required, HTML output is generated. The HTML output is then sent via HTTP to the client for formatting on the client's screen.

Figure 2:
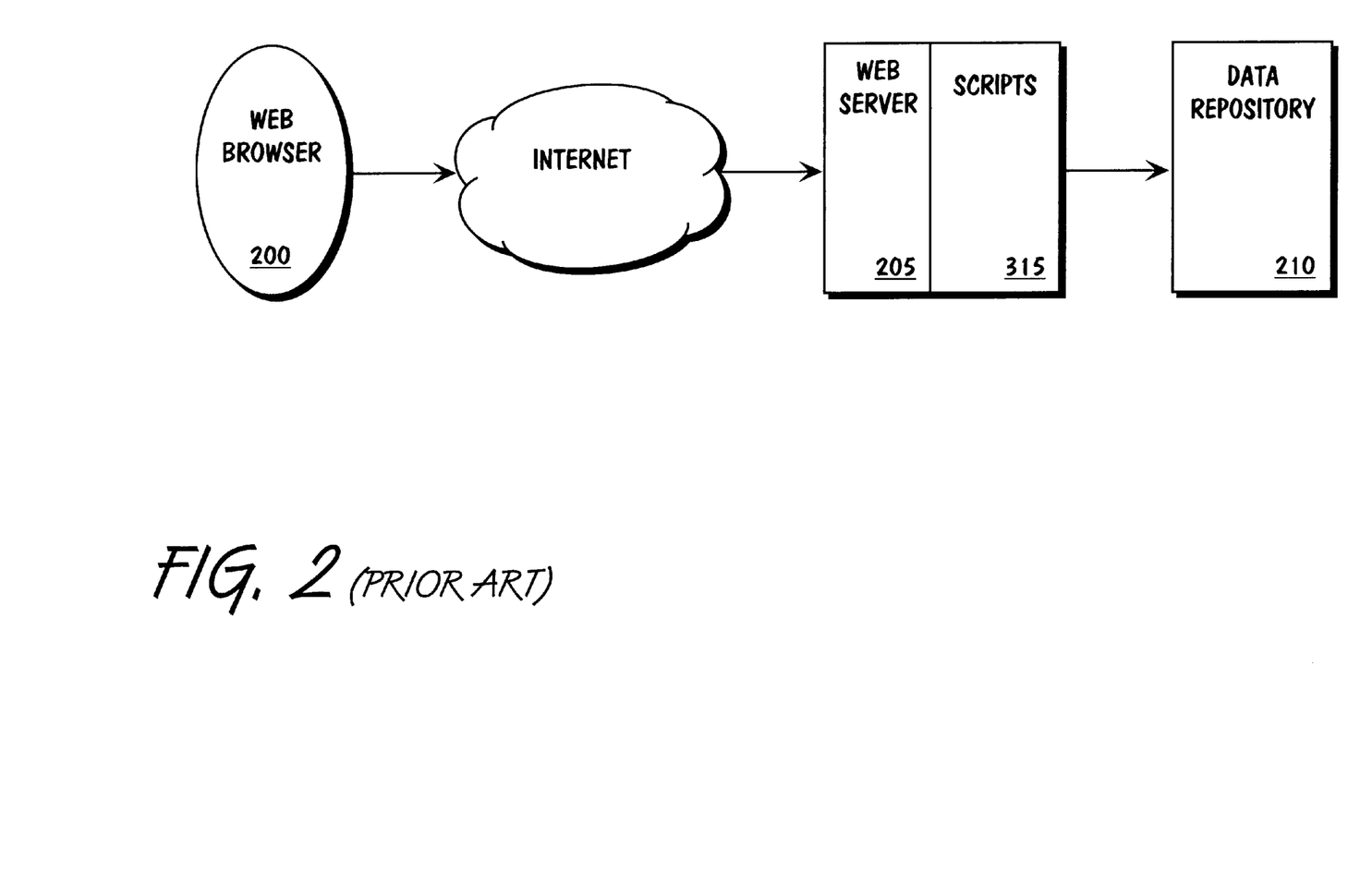
FIGS. 2 illustrates an overview Web architecture today.

FIG. 2 illustrates an overview Web architecture today. As illustrated, Web browser 200 is coupled to Web server 205 and data repository 210 via the Internet. The data repositories reside either on the machine on which Web server 205 resides, or decoupled from Web server 205, on separate machines. In either scenario, users running Web browser 200 access HTML files by clicking on the appropriate URL on a Web page. These HTML files were traditionally static documents that did not change "on the fly" according to interaction with a user. Instead, static HTML files only allowed users to view, save or print the documents. Dynamic HTML publishing is also supported today, i.e. HTML documents are created "on the fly" in response to user requests. Programs such as those running under CGI are typically used to provide this dynamic HTML publishing functionality.

In addition to these elements of Web architecture today, there is a common reliance on interpreted languages, such as Perl, to create programs that provide dynamic functionality. Such interpreted languages typically involve an engine that acts upon a file of instructions written in the given language. This file contains text made up of some words that are commands and some that represent values. The engine parses the text to distinguish the commands from the values and is hard coded to perform actions according to the commands.

Overview of System According To One Embodiment

According to one embodiment of the present invention, an application development environment is provided that overcomes a number of the inherent shortcomings of the Web architecture described above. According to the present invention, a new flexible, extensible architecture is presented that allows end users to create applications on the Web simply and efficiently, without requiring any programming skills. The application development environment according to one embodiment comprises an interpretive server and proprietary databases. The proprietary databases are used to store information pertaining to applications, while the interpretive server interprets the information from the proprietary databases and generates applications. The functionality of the system is improved by storing the information pertaining to applications in the application database as structured data, instead of as unstructured text as in the prior art. The structure of the proprietary databases and the functionality of the interpretive server allows for a simple yet powerful Web application development environment for end users who lack programming skills. Additionally, although the above description assumes Web applications, the same environment may be used to design, generate and store non-Web applications such as client-server applications.

Figure 3A:
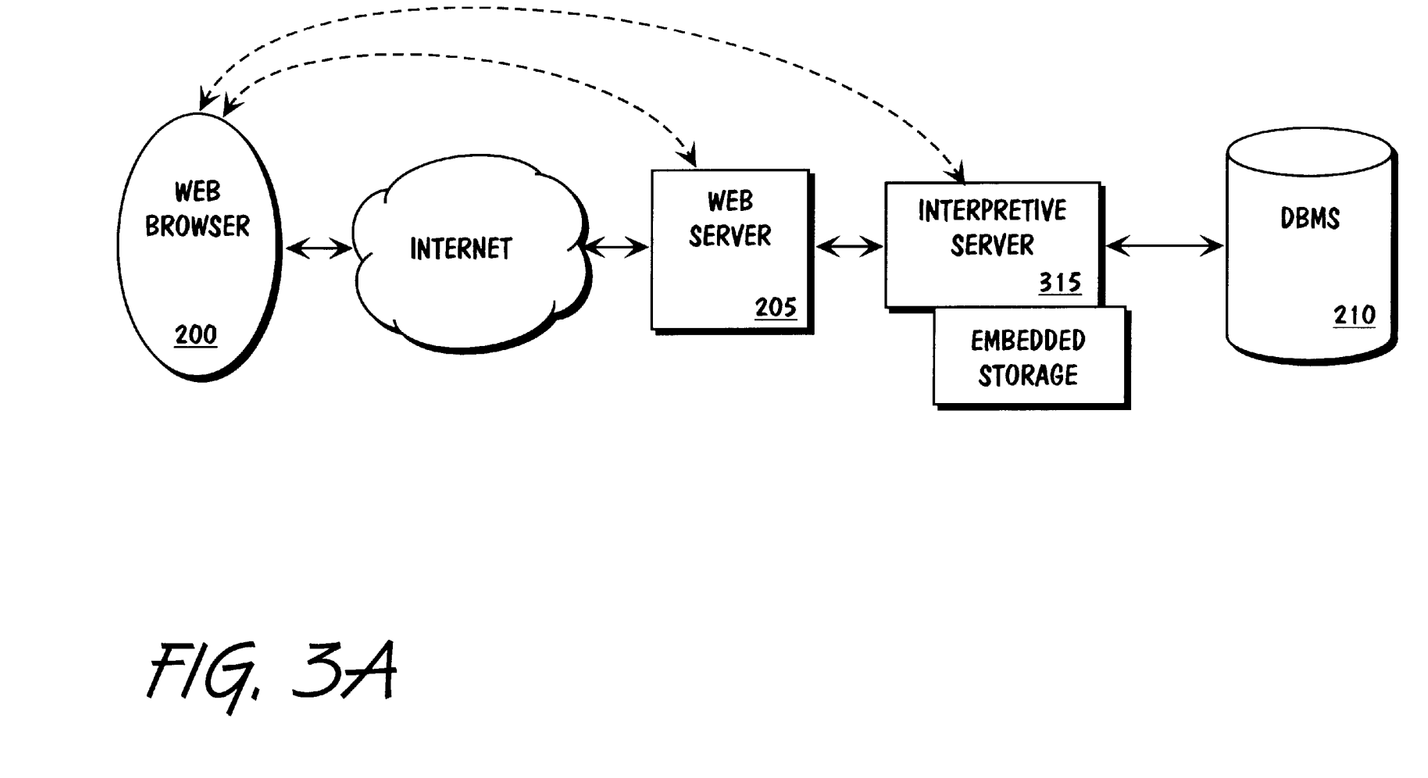
FIG. 3A illustrates an overview of one embodiment of the present invention.
Figure 3B:
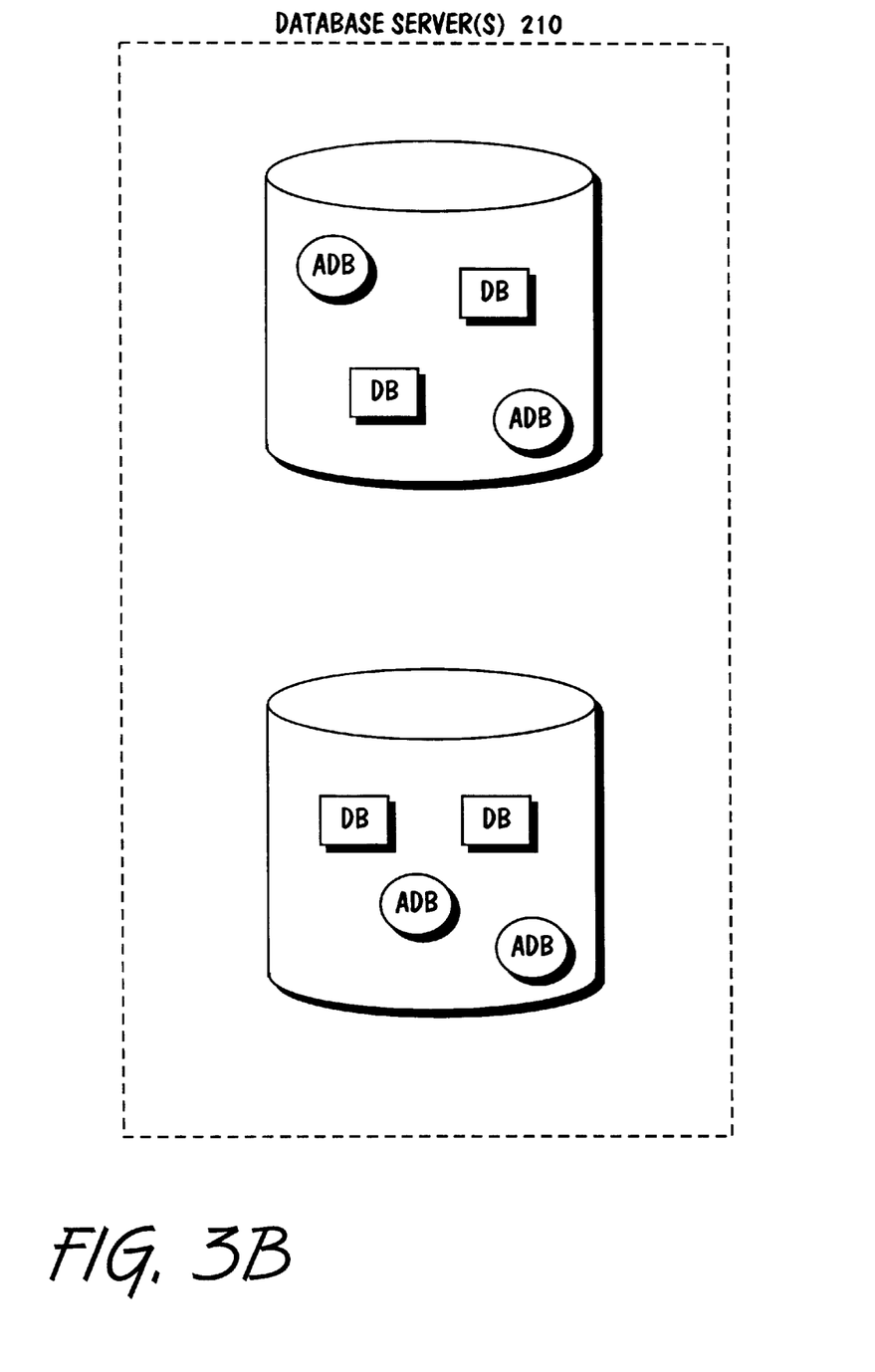
FIG. 3B illustrates an example of a database server according to one embodiment of the present invention.
Figure 3C:
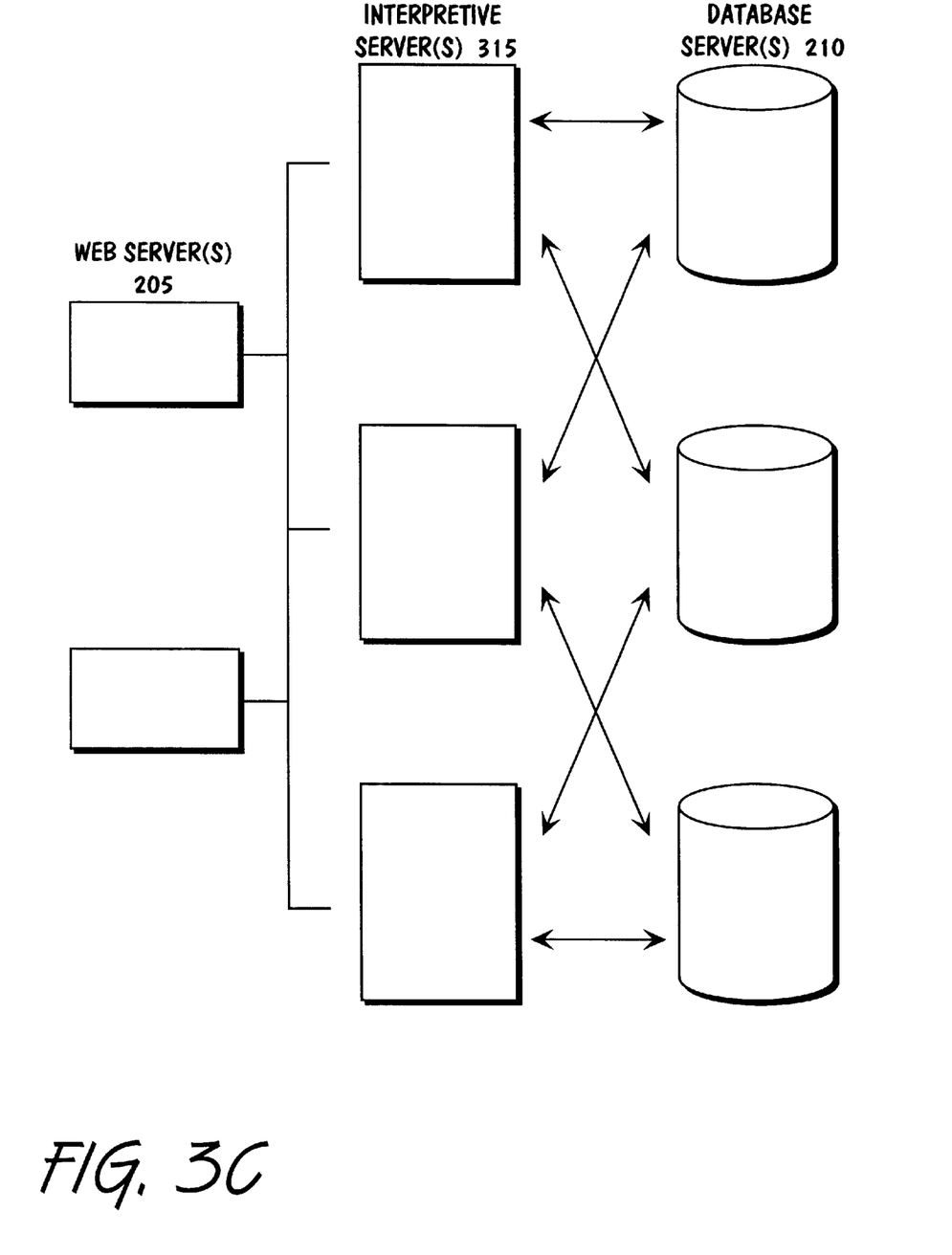
FIG. 3C illustrates the interaction between an interpretive server and a database server according to one embodiment of the present invention.

FIGS. 3A–3C illustrate an overview of one embodiment of the present invention. Specifically, as illustrated in FIG. 3A, Web browser 200 still accesses Web server 205 to retrieve data from data repository 210. In contrast with the architecture illustrated in FIG. 2, however, Web server 205 according to this embodiment does not retrieve data directly from data repository 210. Instead, according to this embodiment, interpretive server 315 interacts with data repository 210 to perform all data retrieval and manipulation. Interpretive server 315 is described in further detail below.

FIG. 3B illustrates an example of database server 210. According to one embodiment of the present invention, database server 210 includes conventional databases (DB) and proprietary databases, hereafter referred to as application databases (ADBs). The structure of the ADB constitutes a language structured as a database schema. Unlike existing interpreted languages, the language defined in an ADB uses the database structure to clearly define commands and values, which can then be acted upon by the interpretive server more readily. ADB functionality is described in further detail below.

Interpretive server 315 interacts with ADBs and DBs to provide the functionality according to one embodiment of the present invention. FIG. 3C illustrates the interaction between interpretive server 315 and database server 210 according to one embodiment. Specifically, interpretive server 315 receives requests from Web browser 200 via Web server 205. Interpretive server 315 then connects initially to an administrative DB (hereafter referred to as AdminDB) and then to an appropriate ADB (illustrated here as ADB) to retrieve "application definition data" pertaining to the application requested. Application definition data includes a variety of information including information pertaining to application security, application presentation and application behavior. All of the application definition data can be different for different users and groups, thus providing for a user/group level to be defined in the ADB above the application level. The application level itself is defined above the data level, which is specified in the AdminDB. The data level consists of default application definition data for each object in the databases.

Interpretive server 315 interprets the retrieved application definition data to execute the application. Interpretive server 315 receives all requests from the browser and interacts with ADBs to generate application logic on the fly according to the application definition data it gets from the ADBs. Interpretive server 315 then retrieves data from one or more DBs and manipulates and displays the data according to the application logic. Interpretive server 315 may also cache all or part of the retrieved data and pre-interpret, and/or compile the ADBs. The following sections describe the functionality of interpretive server 315 and ADBs in further detail.

Interpretive Server

Interpretive server 315 resides on a network coupled to a Web server and a variety of data repositories. The connection between interpretive server 315 and the Web server may be via a Remote Method Invocation (RMI) or other comparable protocol. The connection between interpretive server 315 and the ADBs on the other hand, may be a JDBC (Java Database Connectivity) connection or the equivalent.

Java is an object-oriented, high-performance, multi-threaded programming language developed by Sun Microsystems®. According to one embodiment of the present invention, interpretive server 315 is a Java program, while user interaction with interpretive server 315 occurs via HTML pages displayed by a Web browser or a separate Java program. Java programs that work on Web pages are called "applets." A Java applet is a program designed to be included in an HTML document and run inside a Web browser. Java applets may therefore be used to build dynamic Web pages.

When Web browser 200 connects to interpretive server 315 via Web server 205, a page of an application is downloaded to Web browser 200. The page may contain HTML, JavaScript, Java and/or any scripting or embedded language. The application may present the user with a Web development environment with which the user may proceed to create new Web applications. The Web development environment can be delivered as HTML-only pages. Further details of the application development environment are described below.

When interpretive server 315 connects to a data repository, interpretive server 315 creates and maintains a "pool" of connections to the data repository. This pool of connections is maintained by a connection manager within interpretive server 315. When interpretive server 315 receives a Web browser 200 request via Web server 205, the request is examined to determine the appropriate ADB from which to retrieve application definition data. Interpretive server 315 (or connection manager, more specifically) allocates a connection to the request from the pool of connections to the data repository on which the ADB resides. This connection between the Web browser and the data repository via interpretive server 315 is referred to as a "virtual connection" and interpretive server 315 is described as "managing" all aspects of this virtual connection. This "virtual connection" process also applies to any databases.

According to one embodiment of the present invention, when interpretive server 315 is first introduced into the network environment, interpretive server 315 creates an administrative database, AdminDB, which includes a registry of ADBs. This AdminDB may be configured to reside on any data repository accessible by interpretive server 315. The AdminDB maintains a list of all application databases on all data repositories and information applicable to all registered ADBs. After creating the registry, interpretive server 315 then creates an initial "development" ADB (hereafter referred to as ADBDev) on a selected data repository. ADBDev may be used by a user to create end-user applications or customized development ADBs (described in more detail below). The data repository on which to build ADBDev, end-user applications or new customized development ADBs may be selected automatically by interpretive server 315. The user may alternatively override the automatic selection with a manual specification of a data repository. Each application may be stored in a separate ADB, or multiple applications and ADBDevs may be stored in one ADB. Interpretive server 315, ADBDev, an end-user application and a customized ADB may all reside on a single standalone device. Alternatively, each application or a set of applications may reside on separate remote devices.

As described above, ADBDev may be used by a user to create end-user applications or customized development environments. To create an end-user application, a user may simply utilize ADBDev, the initial development environment provided when interpretive server 315 is first introduced into the Web environment. ADBDev provides the user with a default interface and default configuration for the user to begin developing applications. End user applications generally manipulate data stored in regular DBs (non-ADBs) accessible to the application.

Customized development environments may be created in the same manner as end-user applications. While end-user applications manipulate data stored in a database, customized development ADBs manipulate the underlying data defining ADBDev. Thus, a user may simply alter ADBDev to customize it, or make a copy of ADBDev and then make alterations. In the latter case, the user is then able to use either ADBDev or the new customized development environment. Given that the end-user applications and the customized development ADBs share a similar interface, a user is able to make changes to and customize the development environment in a similar manner to creating and customizing an end-user application. Thus, for example, a user may create multiple customized development environments, each suited to development of a particular type of end-user application. Each customized development ADB is itself an application, and is therefore defined, generated, stored, retrieved and manipulated in the same manner as an end-user application.

As described above, applications are defined by application definition data. Application definition data is stored in ADBs at any location accessible to interpretive server 315. Interpretive server 315 thus processes requests for pages of an application by retrieving the application definition data, interpreting the retrieved application definition data to derive application logic, generating pages of the application in any scripting or embedded language such as HTML, JavaScript or Java, populating the pages with data from a DB and presenting pages of the application to the user. This process is invisible to the end-user, who merely sees an application displayed as requested. Other types of requests can also be processed by interpretive server 315, including requests for database actions, other system actions, data modeling actions, cursor actions, sorting actions and complex pagelets.

Interpretive server 315 also processes permissions at various levels, to give individuals or groups selective control over applications and the ability for one group to approve changes made by another. This highly customizable security mechanism presents users with a significant advantage over existing application development tools. Instead of developing an application and then simply defining access to the application, users according to the present embodiment of the present invention may specify specific versions of "pages" of the application that may be presented to various groups and/or users. "Pages" are described in further detail below.

Thus, for example, a user may create application "Orders" for salespeople to enter orders. This single application may then be manipulated by the user to present different salespeople with different sets of the columns in the application. Salespeople in an LA office may be presented with an "Orders" application where the "Ship from" column is not visible (because the shipping port is fixed). Salespeople in the field may, however, be presented with an "Orders" application where the "Ship from" column is available to be filled in, specifying the closest shipping port. Prior application development environments generally require extensive programming in order to create an application that is tailored to each user. Prior development environments often result in compromised user interfaces that contain non-functional elements for different users.

Instead, according to an embodiment of the present invention, each user or group of users (LA salespeople and field salespeople in this example) has permissions defined in an Access Control List (ACL). The ACL is used to determine the application definition data to be retrieved from the ADB. The ACL also defines the access allowed to the various DBs. The application definition data defines the appropriate "Orders" versions for each user or group. These customized versions thus do not contain inappropriate user interface elements, because the elements do not exist, i.e. application definition data already specifies that these elements do not exist for a particular user or group.

Application Databases (ADBs)

According to one embodiment of the present invention, the format of the ADB corresponds to the format of the data repository. Thus, for example, if the data repository is an Oracle DBMS, then the ADB created on this data repository takes on the format of an Oracle database. If, on the other hand, the data repository is an Informix DBMS, the ADB takes on the format of an Informix database. Thus, according to this embodiment, each ADB is able to take advantage of all DBMS functionality, while providing added functionality not provided by the DBMS.

As described above, ADBs store application definition data pertaining to the corresponding application. More specifically, the application definition data stored in a particular ADB includes information pertaining to application security, application visual characteristics and application behavior. A variety of other information may also be stored as part of the application definition data. Application definition data is stored in an ADB, in contrast to end-user application data stored in conventional DBs. Thus, for example, while end-user application data may refer to the actual data that populates the fields in an application, application definition data includes characteristics of each aspect of each page version and users' and groups' permissions with regard to usage and modification of the application.

Also as described above, each application may be stored in separate ADBs, or multiple applications and ADBDevs may be stored in one ADB. By storing application definition data in an ADB, the present invention gains the advantage of allowing for the manipulation of the application definition data in the same manner and with the same flexibility as standard data manipulation. Thus, the same code base that works with the user's data, to design, generate, store, retrieve and manipulate that data is also able to manipulate the application definition data that is used to create the application. This reduces the size of the code base significantly as compared to prior art application development environments that have to store a code base for the application development tool and a separate code base for the applications developed using the application development tool. Other advantages gained by leveraging the DBMS for services and capabilities include: multi-user creation, modification and use of the same application; a highly scalable architecture in which any number of interpretive servers can interact with any number of data repositories; point-and-click development while viewing the deployed application; and automatic deployment of applications.

Using currently available technology, modifying an application requires first that the user know the language in which an application is created. Second, the programmer faces a challenge in understanding prior work, which is unstructured code. Third, another person faces an ever more daunting challenge of understanding someone else's code. According to one embodiment of the present invention, however, the user simply manipulates data relating to an application, i.e. its application definition data, to change the application. These changes may be presented to the user in a simple point-and-click interface that requires no programming experience. Once the user has specified the changes to the application definition data, interpretive server 315 stores the changes to the application definition data in the appropriate ADB, then interprets the new application definition data to show the user the page with its changes instantly. Thus, in contrast with the prior art where an application programmer would be required to make changes to the application, the user according to this embodiment is able to simply manipulate both the data for the application, as well as the application itself, without any programming knowledge.

Figure 4A:
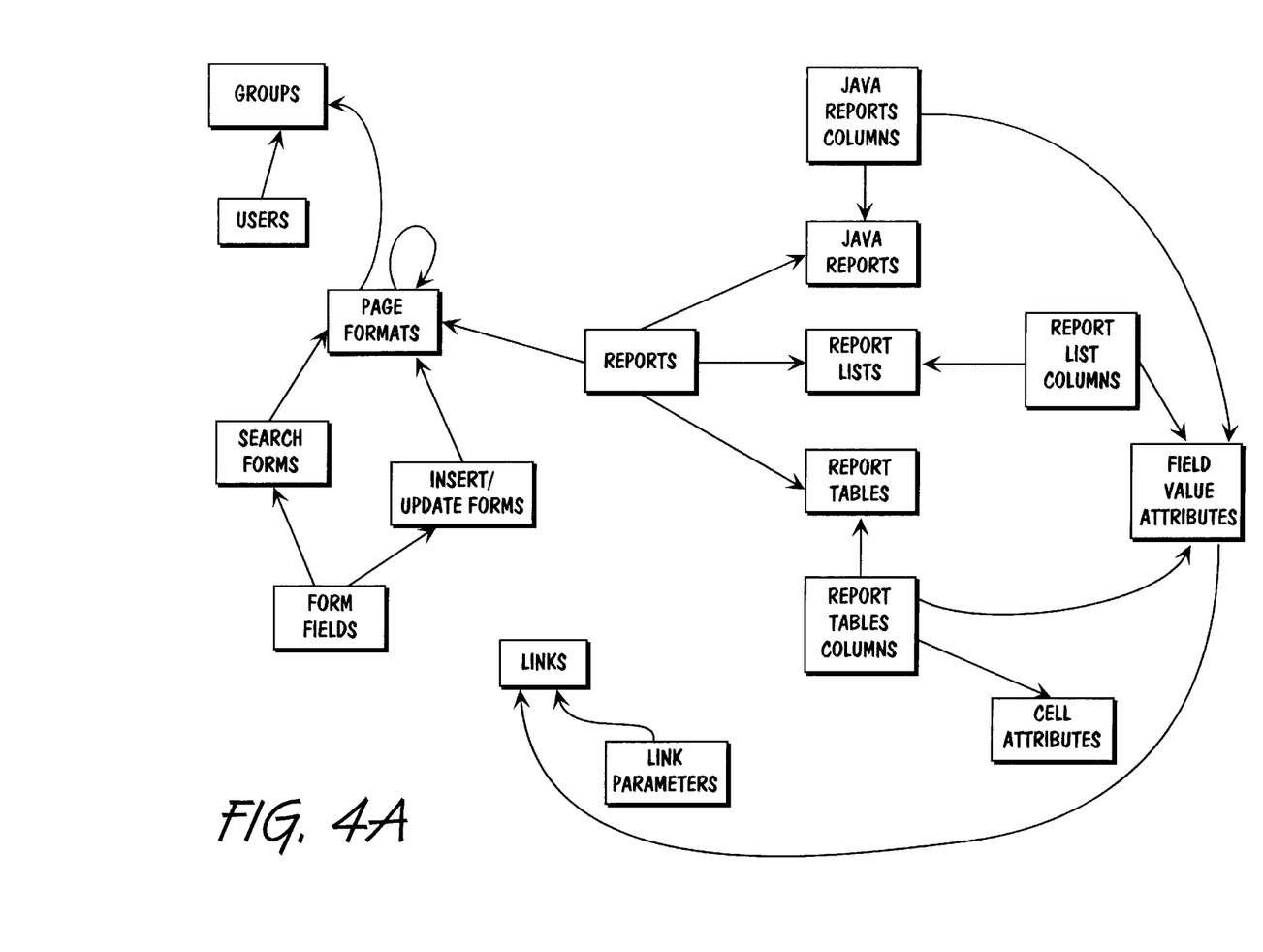
FIGS. 4A–4B illustrate the schema of an application database according to two embodiments of the present invention.
Figure 4B:
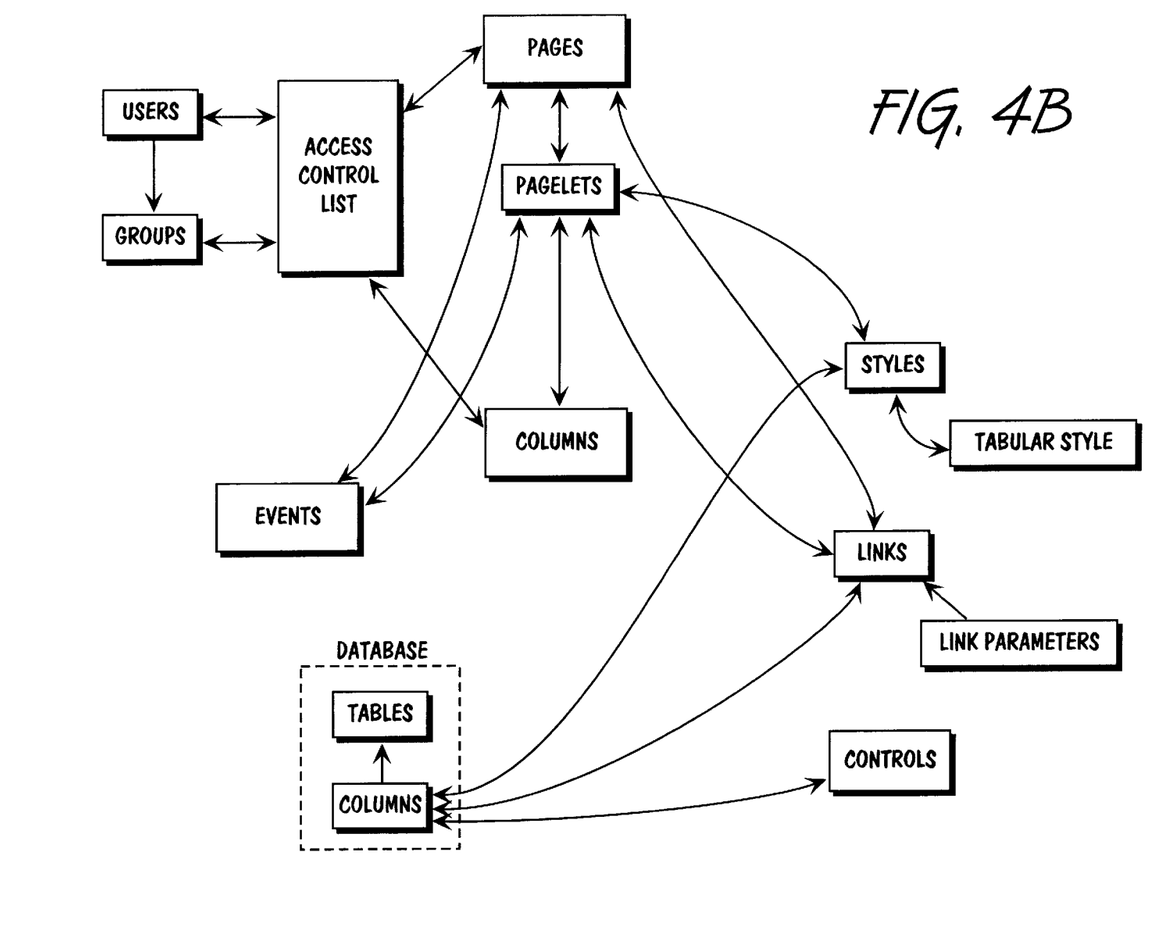

FIGS. 4A–4B illustrate the schema of an ADB according to embodiments of the present invention. Specifically, FIG. 4A illustrates the tables that are created in the data repository to define the structure of the ADB. FIG. 4B illustrates another embodiment of the present invention. More specifically, FIG. 4B illustrates tables that are stored in an ADB according to an alternate database schema. According to this embodiment, the distinction between "forms" and "reports" of the schema in FIG. 4A has been eliminated. Instead, a "pagelet" concept represents both. Multiple pagelets may be grouped together to form a "page" and multiple pages linked together to form an application. As described above, interpretive server 315 includes pre-interpreting and compiling options that allow all or part of an application (i.e. all pages or subset of the pages forming an application) to be pre-interpreted or compiled. Additionally, the data retrieved from the DBs to populate the applications may also be cached.

Figure 4C:
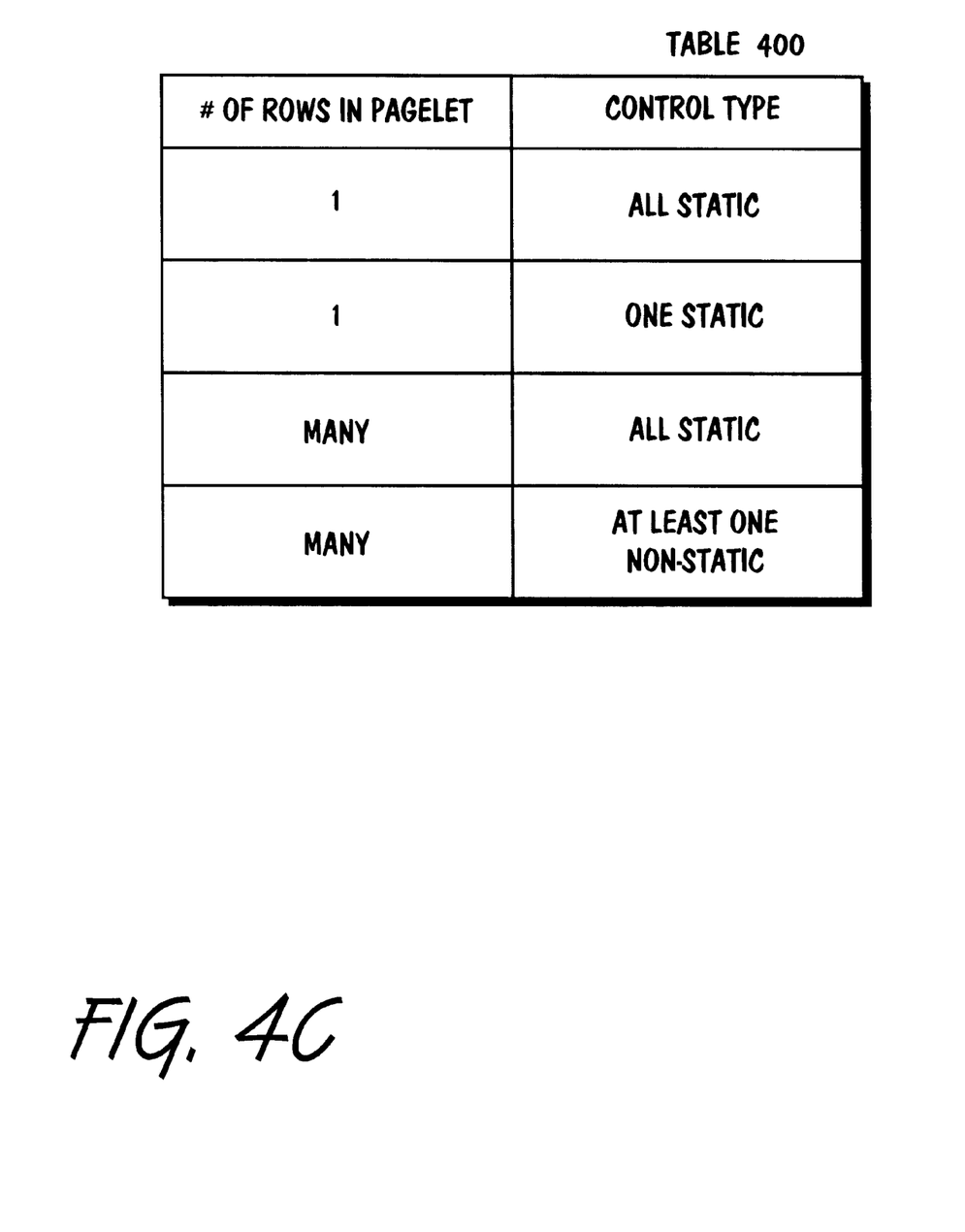
FIG. 4C illustrates the distinction between the traditional concept of "forms" and "reports" applications and "pagelets"

FIG. 4C illustrates this distinction between the traditional concept of "forms" and "reports" applications and "pagelets." A form, for example, traditionally has a single row that is non-static while a report traditionally has multiple rows that are static. According to this embodiment, however, a pagelet may be defined that has a single row that is static, for example, or alternately, a pagelet that has multiple rows that are non-static. In this manner, the artificial distinction between forms and reports is removed and users are able to flexibly create any type of page that suits their purpose.

According to one embodiment of the present invention, the schema of the ADB enables interpretive server 315 to store and retrieve application definition data in and from the ADB. As described above, ADBDev is created when interpretive server 315 is first introduced into the network environment. ADBDev is the basis for the base application development environment the user uses to create applications. ADBDev is created according to the same schema as the applications created using ADBDev, i.e. development environments are a type of application. This presents the user with significant advantages. As described above, given that the user applications and the customized development ADBs share a similar interface, a user is able to make changes to and customize the development environment as easily as he or she may create a user application.

Additionally, as interpretive server 315 is upgraded to add functionality to ADBDev, the new functionality is available for all applications. This is in significant contrast to current methods whereby the functionality of the development environments is separate from the functionality of the applications. Thus, new functionality in the development environment is not necessarily available for applications. According to this embodiment, new capabilities or features that are added to interpretive server 315 are automatically accessible by any development environment and all other existing and future applications. In addition, if the new functionality involves fundamental changes to the ADB schema/language, applications can be readily ported to the new schema/language. Finally, because the language is structured as a database, applications modified by multiple parties can be readily merged to combine new functionality. For example, an application upgraded by one party that has been customized by another party can be readily upgraded by the second party in a manner that preserves the customization.

Interaction Between Interpretive Server 315 and ADBs

Figure 5A:
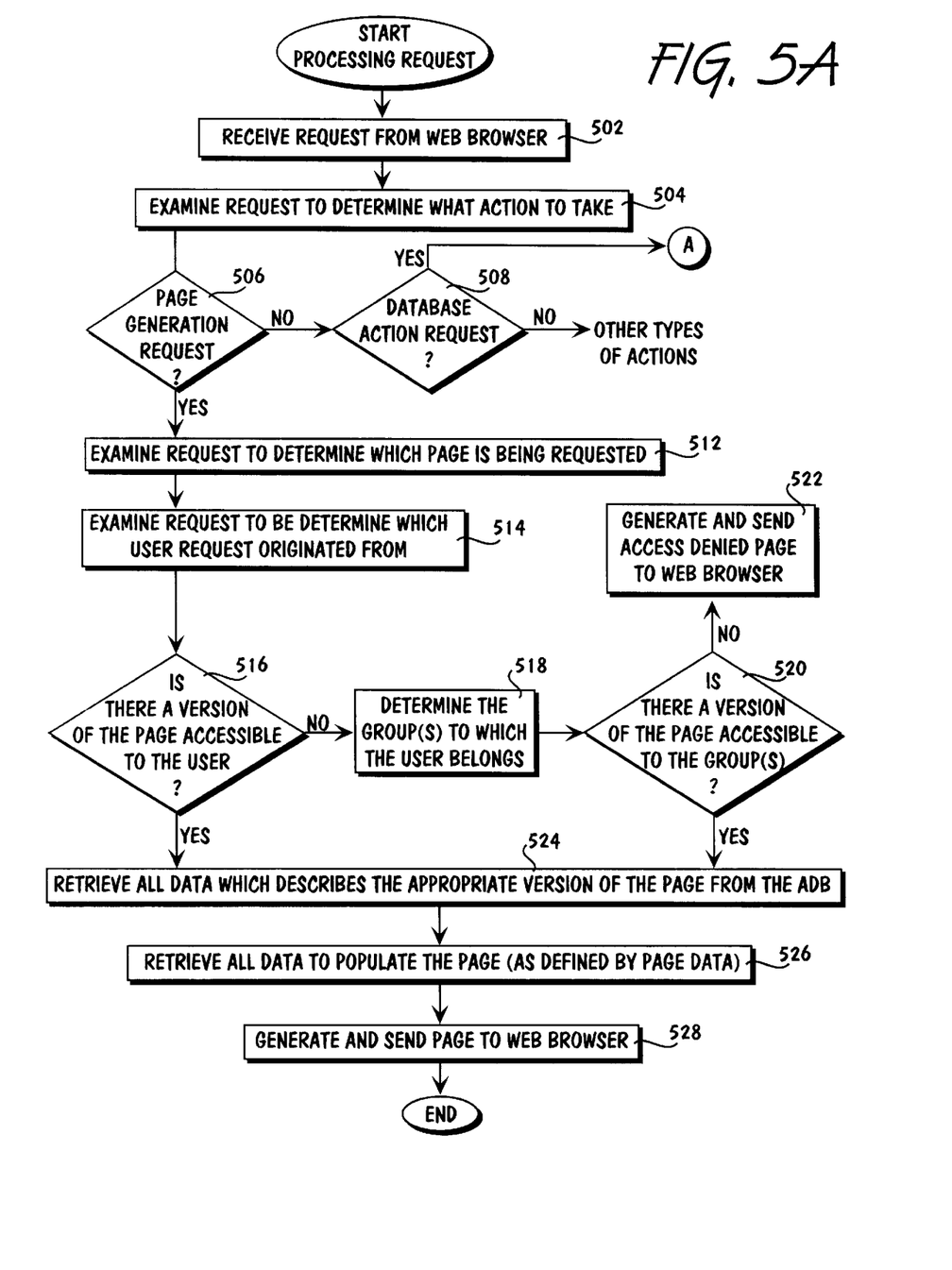
FIGS. 5A–5B are flowcharts illustrating the processing of a request from a Web browser.
Figure 5B:
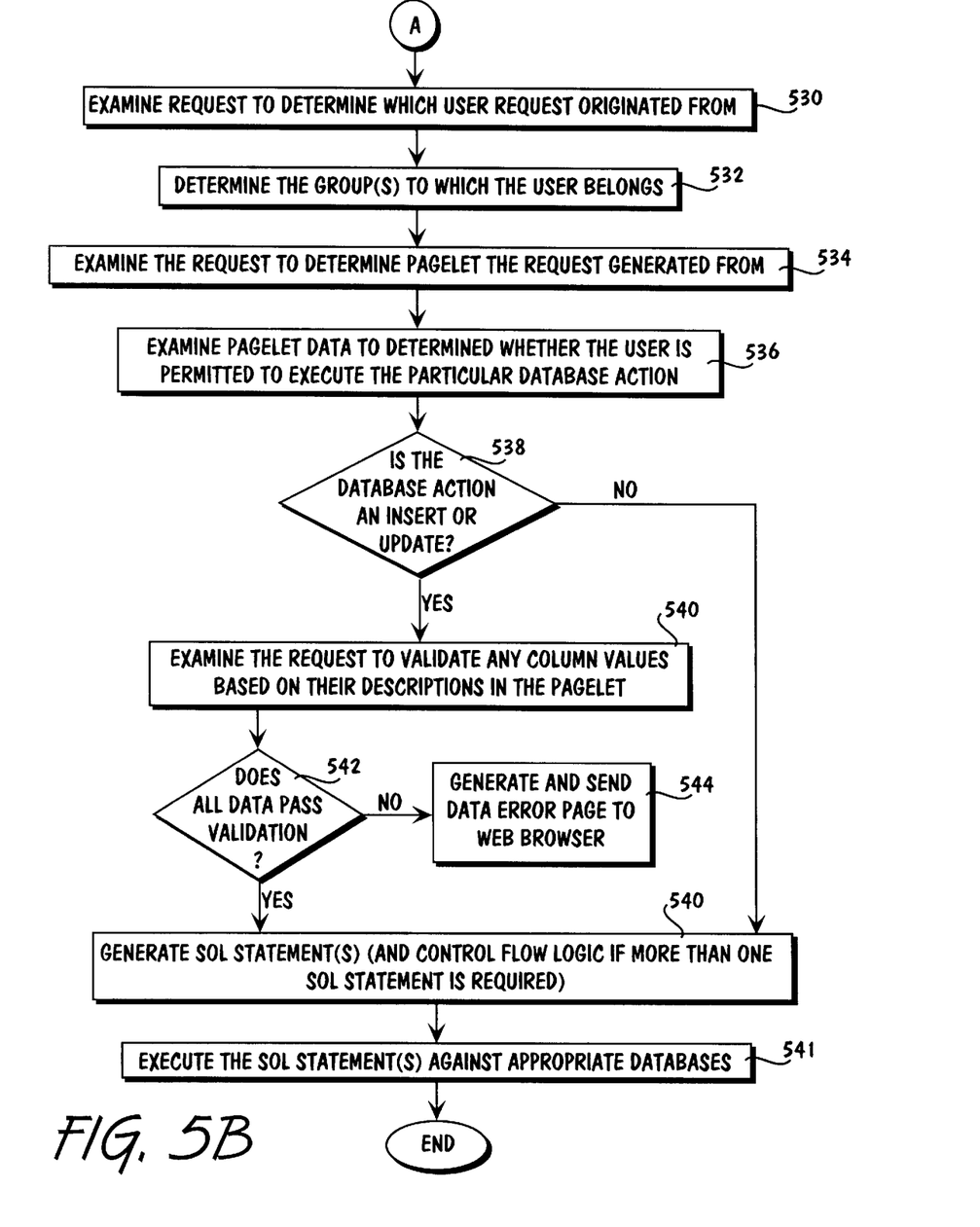

FIGS. 5A–5B are flowcharts illustrating one embodiment of the present invention. In step 502, a request is received from a Web browser. The request is examined in step 504 to determine what action to take. If in step 506 the request is determined to be a page generation request, then in step 512, the request is examined to determine which page is being requested. Then, in step 514, the request is examined again to determine which user the request originated from. In step 516, the determination is made whether there is a version of the page accessible to the user. If there is no page accessible to the user, then in step 518, the group(s) to which the user belongs is determined. In step 520, the determination is then made whether there is a version of the page accessible to the groups to which the user belongs. If there is no version of the page accessible to the groups to which the user belongs, in step 522, an access denied page is generated and sent to the Web browser. If there is a version of the page accessible to the user in either step 516 or step 520, then in step 524, data which describes the appropriate version of the page is retrieved from the ADB. In step 526, data is retrieved to populate the page as defined by the page data. Then, in step 528, a page is generated and sent to the Web browser.

If in step 506 the request is determined not to be a page generation request, then the request may be for database actions, other system actions, data modeling actions, cursor actions, sorting actions or complex pagelets. If in step 508, for example, the request is deemed to be a database action, then as shown in FIG. 5B, in step 530 the request is examined to determine which user the request originated from. The groups to which the user belongs are then determined in step 532, and in step 534, the request is examined to determine the pagelet from which the request was generated. In step 536, the pagelet data is examined to determine whether the user is permitted to execute the particular database action. In step 538, the particular database action is examined to determine whether it is an insert or an update. If the step is an insert or an update, then in step 540, the request is examined to validate any column values based on their descriptions in the pagelet. In step 542, the data is examined to determine whether it passes data validation. If it does not pass data validation, then a data error page is generated and sent to the Web browser. If the data does pass validation, or if the database action in step 538 is not an insert or an update, then in step 546, a SQL statement is generated. Additionally control flow logic is also generated in this step if more than one SQL statement is required. Finally, in step 548, the SQL statement is executed against the appropriate databases.

Complex Interactions Between Interpretive Server 315, ADBs and DBs

Figure 6:
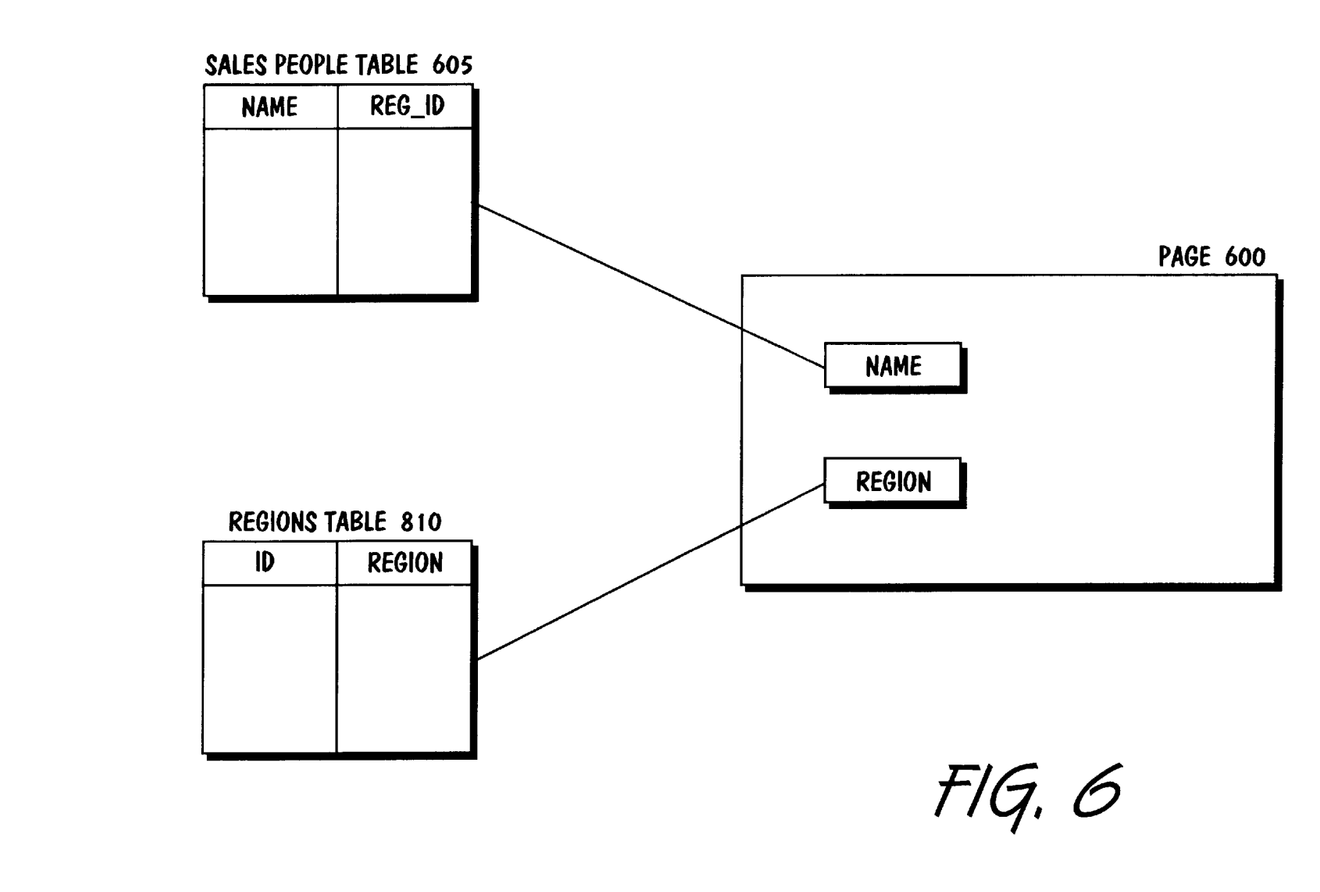
FIG. 6 illustrates an embodiment of the present invention.

FIG. 6 illustrates an embodiment of the present invention. According to this embodiment, a page may be created that includes data from multiple tables, and that requires updates to multiple tables during a single transaction. Thus, for example, as illustrated in FIG. 6, page 600 includes multiple columns, each displaying data from a different table. For example, the NAME column displays data from Salespeople table 605 while the REGION column displays data from Regions table 610. The Reg_ID column relates Salespeople table 605 to Regions table 610 by referencing to the ID column.

According to this embodiment, when an update is performed in a pagelet, multiple tables may be affected. Interpretive server 315 handles all aspects of updating each table with the appropriate information. This is in contrast with currently available application technology wherein tables may only be updated individually, unless the application developer hardcodes logic in the application code to handle the update of multiple tables. The ability to perform multi-table transactions easily is unavailable to current systems without a lot of hardcoding by the application developer.

Thus, a method and system for designing, generating and storing applications is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. A system for generating a Web application, the system comprising:
  a Web client;
  a Web server coupled in communication with the Web client;
  an interpretive server coupled in communication with the Web client and the Web server; and
  an application database coupled in communication with the Web client via the interpretive server, said interpretive server to maintain virtual state information pertaining to the connection between the web client and the application database.

2. The system according to claim 1 wherein the application database stores application definition data.

3. The system according to claim 2 wherein the interpretive server retrieves and interprets the application definition data to generate the Web application.

4. The system according to claim 2 wherein the application definition data include information pertaining to application security, application visual characteristics and application behavior.

5. The system according to claim 1 wherein the interpretive server is coupled in communication with the Web client via the Web server.

6. The system according to claim 1 wherein the application database comprises includes a proprietary database residing in a database management system (DBMS).

7. The system according to claim 6 wherein the proprietary database stores application definition data.

8. The system according to claim 7 wherein the interpretive server retrieves and interprets the application definition data to generate the Web application.

9. A method for generating a Web Application comprising:
  receiving a request from a Web user;
  retrieving application definition data from the appropriate application database that corresponds to the request;
  retrieving data from a database corresponding to the application definition data;
  interpreting the application definition data to derive application programming logic to generate a page of the Web application, the page including the data retrieved from the database.

10. The method according to claim 9 further including maintaining a virtual state between the Web user and the application database.

11. The method according to claim 10 wherein the step of maintaining the virtual state between the Web user and the application database further comprises:
  maintaining a pool of connections to the application database;
  allocating a connection from the pool of connections to each request from the Web user to the application database; and
  maintaining information pertaining to each connection between the Web user and the application database.

12. The method according to claim 11 wherein maintaining information pertaining to each connection between the Web user and the application database further includes the step of caching the information.

13. An interpretive server for generating Web applications, the interpretive server comprising:
  a connection manager for managing a pool of connections to an application database, wherein the connection manager maintains a virtual connection between a web user that is coupled to the interpretive server and the application database; and
  an interpretive engine for interpreting data retrieved from the application database.

14. A machine-readable medium that provides instructions, that when executed by a machine, cause said machine to perform operations comprising:
  receiving a request from a web user;
  retrieving application definition data from the appropriate application database that corresponds to the request;
  retrieving data from a database corresponding to the application definition data; and
  interpreting the application definition data to generate a page of the web application, the page including the data retrieved from the database.

15. The machine-readable medium of claim 14 that provides further instructions that when executed by the machine causes said machine to perform a further operation comprising interpreting the application definition data to derive application programming logic to generate the Web application.

16. The machine-readable medium of claim 14 that provides further instructions that when executed by the machine causes said machine to perform a further operation comprising maintaining a virtual connection between the web user and the application database.

17. The machine-readable medium of claim 16 that provides further instructions that when executed by the machine causes said machine to perform further operations comprising maintaining a virtual connection between the web user and the application database, wherein maintaining the virtual connection further comprises:
  maintaining a pool of connections to the application database;
  allocating a connection from the pool of connections to each request from the Web client to the application database; and
  maintaining information, including caching the information, pertaining to each connection between the Web client and the application database.

18. A method for generating a web application comprising:

transmitting a web development environment from a web server to a web user;

receiving a web server request from the web user;

retrieving application definition data from an application database wherein the application definition data corresponds to the request;

retrieving data from a database corresponding to the application definition data; and interpreting the application definition data to generate a page of the web application, the page including the data retrieved from the database.

19. The method of claim 18 wherein the web development environment comprises a default interface and default configurations.

20. The method of 18 wherein receiving a request from the web user comprises:

the web user generating via the web development environment a request; and transmitting the request to the web server.

* * * * *